(12) United States Patent
Ayach et al.

(10) Patent No.: US 8,929,473 B2
(45) Date of Patent: Jan. 6, 2015

(54) COMBINING BASEBAND PROCESSING AND RADIO FREQUENCY BEAM STEERING IN WIRELESS COMMUNICATION SYSTEMS

(75) Inventors: Omar El Ayach, Austin, TX (US); Sridhar Rajagopal, Plano, TX (US); Shadi Abu-Surra, Richardson, TX (US); Zhouyue Pi, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 99 days.

(21) Appl. No.: 13/552,565

(22) Filed: Jul. 18, 2012

(65) Prior Publication Data

US 2013/0028341 A1    Jan. 31, 2013

Related U.S. Application Data

(60) Provisional application No. 61/512,846, filed on Jul. 28, 2011.

(51) Int. Cl.
| | | |
|---|---|---|
| *H04B 7/02* | (2006.01) | |
| *H04B 7/04* | (2006.01) | |
| *H04B 7/06* | (2006.01) | |
| *H04L 25/02* | (2006.01) | |

(52) U.S. Cl.
CPC .......... *H04B 7/0478* (2013.01); *H04L 25/0224* (2013.01); *H04B 7/065* (2013.01); *H04B 7/0465* (2013.01)
USPC ....................................................... 375/267

(58) Field of Classification Search
CPC ... H04L 1/0631; H04L 1/0625; H04L 1/0681; H04L 1/02; H04B 7/0473

USPC .......................................................... 375/267
See application file for complete search history.

(56) References Cited

U.S. PATENT DOCUMENTS

| | | | |
|---|---|---|---|
| 7,714,783 B2 | 5/2010 | Niu et al. | |
| 7,773,030 B2 | 8/2010 | Xia et al. | |
| 2007/0071121 A1* | 3/2007 | van Rooyen | 375/260 |
| 2008/0198946 A1 | 8/2008 | Lee et al. | |
| 2008/0260058 A1 | 10/2008 | Li | |
| 2008/0303701 A1* | 12/2008 | Zhang et al. | 341/106 |
| 2009/0067525 A1 | 3/2009 | Kim et al. | |
| 2009/0149221 A1* | 6/2009 | Liu et al. | 455/561 |
| 2009/0232240 A1 | 9/2009 | Lakkis | |
| 2009/0238310 A1* | 9/2009 | Catreux et al. | 375/340 |
| 2009/0257521 A1* | 10/2009 | Kent et al. | 375/260 |

(Continued)

OTHER PUBLICATIONS

International Search Report dated Feb. 26, 2013 in connection with International Patent Application No. PCT/KR2012/006072, 3 pages.

(Continued)

*Primary Examiner* — Santiago Garcia

(57) ABSTRACT

A method and apparatus enable combined baseband (BB) and radio frequency (RF) processing of signals. The method includes receiving, by a receiver, channel estimation information for a channel between a transmitter and the receiver. The method includes identifying a plurality of paths in the channel based on the channel estimation information. The method includes calculating an RF precoding matrix for precoding one or more signals to be transmitted on each of the identified paths. The RF precoding matrix includes a phase shift for each of the identified paths. Additionally, the method includes calculating a BB precoding matrix for precoding the one or more signals by a BB precoding unit associated with the transmitter.

20 Claims, 10 Drawing Sheets

(56) References Cited

U.S. PATENT DOCUMENTS

| | | | | |
|---|---|---|---|---|
| 2010/0040124 | A1* | 2/2010 | Wurth | 375/222 |
| 2010/0142612 | A1* | 6/2010 | van Rooyen | 375/239 |
| 2010/0166098 | A1* | 7/2010 | Luz et al. | 375/267 |
| 2011/0080961 | A1* | 4/2011 | Hui et al. | 375/259 |
| 2011/0096859 | A1 | 4/2011 | Kim et al. | |
| 2011/0096860 | A1* | 4/2011 | Catreux et al. | 375/267 |
| 2011/0151918 | A1 | 6/2011 | Seo et al. | |
| 2011/0293044 | A1* | 12/2011 | Kent et al. | 375/320 |
| 2012/0051287 | A1* | 3/2012 | Merlin et al. | 370/328 |
| 2012/0120995 | A1* | 5/2012 | Wurth | 375/222 |
| 2012/0140801 | A1* | 6/2012 | Asplund et al. | 375/219 |
| 2012/0207047 | A1* | 8/2012 | Liao et al. | 370/252 |
| 2012/0281780 | A1* | 11/2012 | Huang et al. | 375/267 |
| 2013/0223557 | A1* | 8/2013 | Kent et al. | 375/267 |
| 2013/0281101 | A1* | 10/2013 | Yu et al. | 455/450 |

OTHER PUBLICATIONS

Written Opinion of the International Searching Authority dated Feb. 26, 2013 in connection with International Patent Application No. PCT/KR2012/006072, 6 pages.

Pallav Sudarshan, et al., "Channel Statistics-Based RF Pre-Processing with Antenna Selection", IEEE Transactions on Wireless Communications, vol. 5, No. 12, Dec. 2006, pp. 3501-3511.

Xiayu Zheng, et al., "MIMO Transmit Beamforming Under Uniform Elemental Power Constraint", IEEE Transactions on Signal Processing, vol. 55, No. 11, Nov. 2007, pp. 5395-5406.

David J. Love, et al., "Limited Feedback Unitary Precoding for Spatial Multiplexing Systems", IEEE Transactions on Information Theory, vol. 51, No. 8, Aug. 2005, pp. 2967-2976.

Robert Tibshirani, "Regression Shrinkage and Selection via the Lasso", Journal of the Royal Statistical Society, Series B (Methodological), vol. 58, No. 1, 1996, pp. 267-288.

Y. C. Pati, et al., "Orthogonal Matching Pursuit: Recursive Function Approximation with Applications to Wavelet Decomposition", IEEE, 1993, pp. 40-44.

Joel A. Tropp, et al., "Signal Recovery from Random Measurements Via Orthogonal Matching Pursuit", IEEE Transactions on Information Theory, vol. 53, No. 12, Dec. 2007, pp. 4655-4666.

* cited by examiner

COMBINING BASEBAND PROCESSING AND RADIO FREQUENCY BEAM STEERING IN WIRELESS COMMUNICATION SYSTEMS

CROSS-REFERENCE TO RELATED APPLICATION(S) AND CLAIM OF PRIORITY

The present application is related to U.S. Provisional Patent Application No. 61/512,846, filed Jul. 28, 2011, entitled "LOW COMPLEXITY PRECODING FOR MILLIMETER WAVE BROADBAND SYSTEMS". Provisional Patent Application No. 61/512,846 is assigned to the assignee of the present application and is hereby incorporated by reference into the present application as if fully set forth herein. The present application hereby claims priority under 35 U.S.C. §119(e) to U.S. Provisional Patent Application No. 61/512,846.

TECHNICAL FIELD

The present application relates generally to processing of signals in a wireless communication system and, more specifically, to combined baseband and radio frequency (RF) processing of signals.

BACKGROUND

Millimeter wave (mmWave) cellular systems have been proposed to accommodate the explosive trends in mobile data demands due to the availability of large bands of spectrum. Millimeter wave's high carrier frequency facilitates packing many antenna elements in small form factors, thus enabling multiple-input multiple-output (MIMO) processing with very large arrays. The concept of massive MIMO is believed to play a key role in future wireless systems.

Precoding in mmWave systems with large arrays is needed to counteract high path loss with highly directional transmission. Prior mmWave precoding strategies, however, have made very limited use of MIMO signal processing results for a variety of reasons. For example, MIMO often assumes hardware complexity that is impractical in large arrays, such as a dedicated radio frequency (RF) chain per antenna element. This architecture places constant modulus constraints on precoder designs.

To address this problem, antenna selection and equal gain transmission have been proposed. Antenna selection, however, does not fully utilize the spectral efficiency offered by large antenna arrays, and even more is not designed to provide multiplexing gain. While equal gain transmission generally performs better than antenna selection, it fails to approach the maximum data rate possible in the system. In the case of single stream beamforming, equal gain beamforming solutions are limited to iterative algorithms that are not guaranteed to converge to a globally optimum solution. Therefore, there are very limited MIMO precoding designs that allow systems to approach capacity while satisfying the hardware constraints present in a millimeter wave transceiver.

Moreover, precoding design and analysis, such as equal gain transmission, often assumes idealized fading environments, such as Rayleigh fading. However, scattering is limited by the large pathloss in mmWave systems. Moreover, the richness of scattering in the wireless channel does not scale with antenna array size. This makes idealized fading unrealistically rich, especially when very large tightly packed arrays are considered. Realistic models, such as clustered channel models, have been proposed, though they are seldom used in precoder design. This outlines yet another shortcoming of existing precoding solutions, which is the lack of structure in the precoders. When the channel structure is neglected by assuming distributions like Rayleigh, equal gain precoders or optimal singular value decomposition solutions (which are too complex to implement in hardware) have a uniform distribution over the large feasible set. This uniform distribution means that a lot of information needs to be fed back to the transmitter in order to perform precoding. In general, the number of free variables that needs to be fed back scales with the number of transmit antennas. When the number of transmit antennas is on the order of tens or hundreds, as is the case in millimeter wave systems, this amount of feedback can incur prohibitively large overhead.

Accordingly, there is a need for methods, apparatuses, and systems that address one or more of the above-described issues.

SUMMARY

A method and apparatus enables combined baseband (BB) and radio frequency (RF) processing of signals in a wireless communication system.

In various embodiments, a method includes receiving, by a receiver, channel estimation information for a channel between a transmitter and the receiver. The method includes identifying a plurality of paths in the channel based on the channel estimation information. The method includes calculating an RF precoding matrix for precoding one or more signals to be transmitted on each of the identified paths. The RF precoding matrix includes a phase shift for each of the identified paths. Additionally, the method includes calculating a BB precoding matrix for precoding the one or more signals by a BB precoding unit associated with the transmitter.

In various embodiments, an apparatus includes a receiver and a processing unit. The receiver is configured to receiving channel estimation information for a channel between a transmitter and the receiver. The processing unit is configured to identify a plurality of paths in the channel based on the channel estimation information and calculate a radio frequency (RF) precoding matrix for precoding one or more signals to be transmitted on each of the identified paths. The RF precoding matrix includes phase shift for each of the identified paths. The processing unit is configured to calculate a baseband (BB) precoding matrix for precoding the one or more signals by a BB precoding unit associated with the transmitter.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
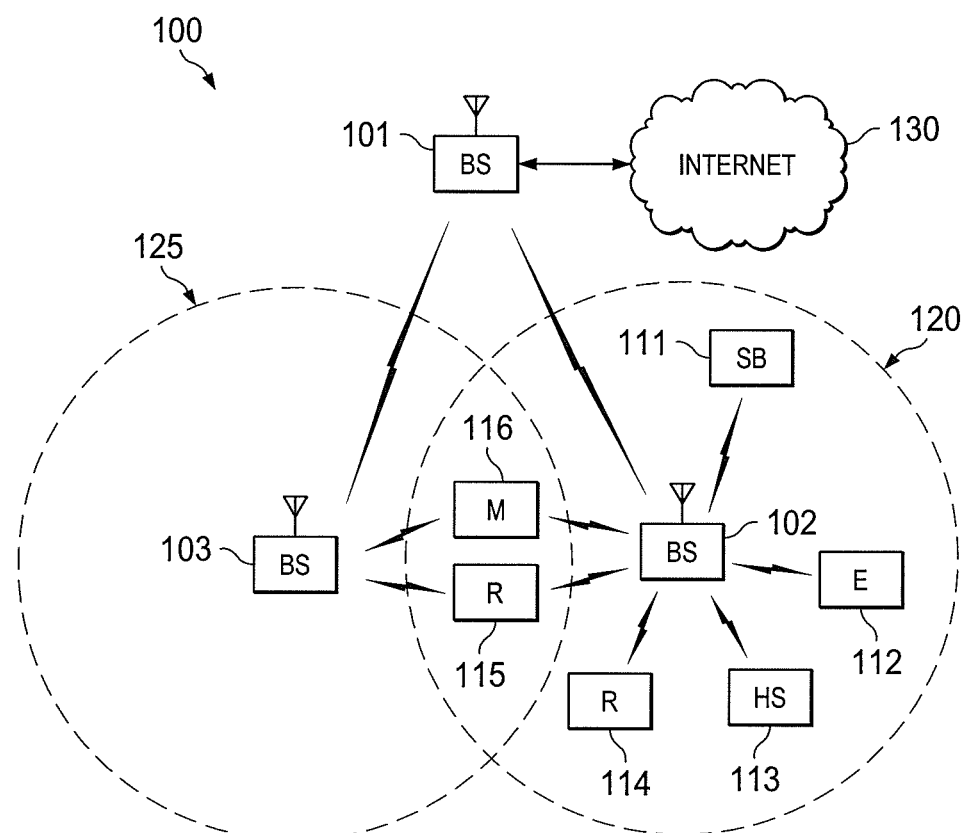
FIG. 1 illustrates an exemplary wireless system which transmits messages in accordance with an illustrative embodiment of the present disclosure.
Figure 2:
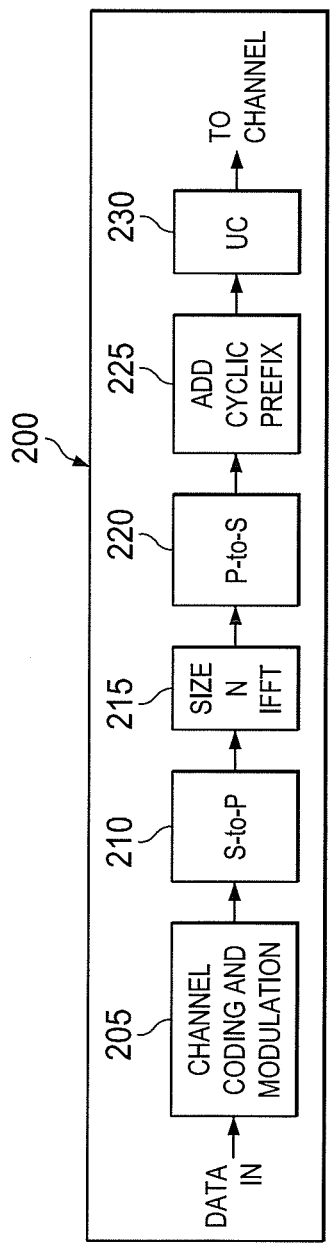
FIG. 2 illustrates a high-level diagram of an orthogonal frequency division multiple access transmit path in accordance with an illustrative embodiment of the present disclosure.
Figure 3:
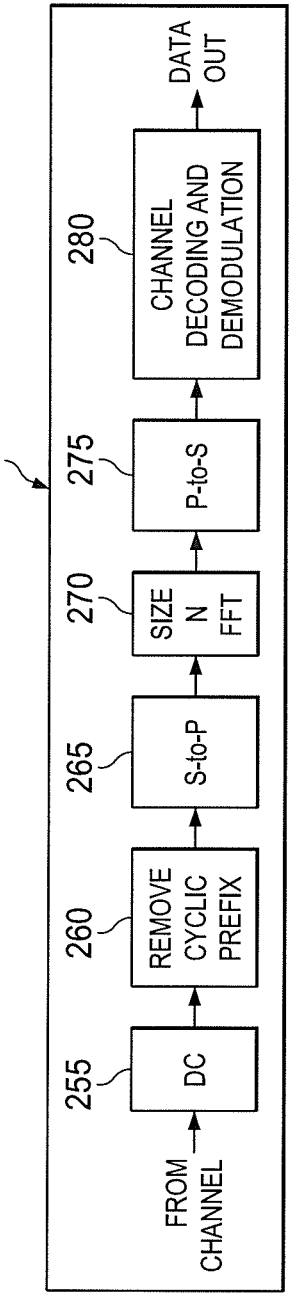
FIG. 3 illustrates a high-level diagram of an orthogonal frequency division multiple access receive path in accordance with an illustrative embodiment of the present disclosure.

FIGS. 1-3 below describe various embodiments implemented in wireless communications systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (or user equipment (UE)) within coverage area 120 of base station 102. The first plurality of subscriber stations includes subscriber station 111, which may be located in a small business (SB); subscriber station 112, which may be located in an enterprise (E); subscriber station 113, which may be located in a WiFi hotspot (HS); subscriber station 114, which may be located in a first residence (R); subscriber station 115, which may be located in a second residence (R); and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless system 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a subscriber station (e.g. subscriber station 116 of FIG. 1). In other examples, for uplink communication, the receive path circuitry 300 may be implemented in a base station (e.g. base station 102 of FIG. 1) or a relay station and the transmit path circuitry 200 may be implemented in a subscriber station (e.g. subscriber station 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

Various embodiments of the present disclosure provide a novel precoding algorithm for use in communication systems to provide highly-directional transmission resulting in spectral efficiencies approaching the theoretical upper bound of capacity. The algorithms in accordance with the present disclosure can be implemented in low complexity hardware. The algorithms in accordance with the present disclosure may be ideal for systems which employ large antenna arrays that are served by only a few radio frequency chains. The mismatch between array size and the number of RF chains introduces very stringent constraints on signal transmission which have mostly been overlooked.

Figure 4:
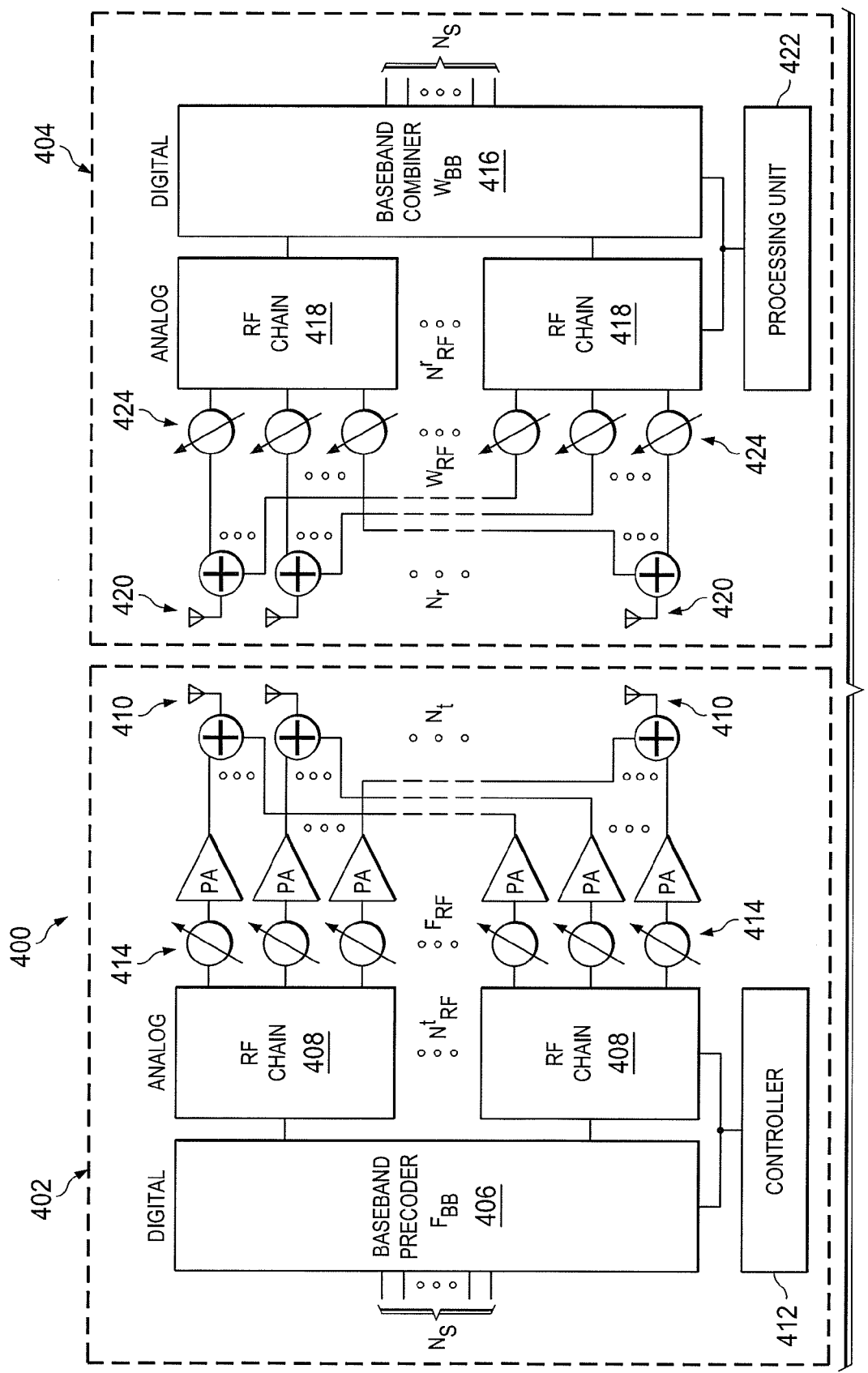
FIG. 4 illustrates a block diagram of a wireless communication system in accordance with the present disclosure.

FIG. 4 illustrates a block diagram of a wireless communication system 400 in accordance with the present disclosure. Wireless communication system 400 includes transmitter 402 and receiver 404. Transmitter 402 transmits signals at a transmit end in wireless communication system 400. For example, the transmitter 402 may be a transmitter in a base station (e.g. base station 102 of FIG. 1) or relay station for downlink communication. In other embodiments, the transmitter 402 may be a transmitter in a subscriber station (e.g. subscriber station 116 of FIG. 1) for uplink communications.

Similarly, the receiver 404 receives signals at a receive end in wireless communication system 400. For example, the receiver 404 may be a receiver in a subscriber station (e.g. subscriber station 116 of FIG. 1) for downlink communication. In other embodiments, the transmitter 402 may be a transmitter for a base station (e.g. base station 102 of FIG. 1) or a relay station for uplink communications.

The description of wireless communication system 400 is based on transmit ends and receive ends of communication paths in wireless communication system 400. Various descriptions may discuss activities performed during downlink communication (e.g., the transmitter 402 being in a base station and the receiver 404 being in a subscriber station). However, such descriptions may apply to activities performed during uplink communication as well (e.g., the transmitter 402 being in a subscriber station, and the receiver 404 being in a base station). In various embodiments, one device (e.g., a base station, relay station or subscriber station) may include a transmitter that operates in accordance with the description of transmitter 402 for one of uplink and downlink communication and a receiver that operates in accordance with the description of receiver 404 for the other one of uplink and downlink communication.

In this illustrative embodiment, the transmitter 402 includes BB precoding unit 406, a plurality of transmitter RF signal processing chains 408, and a plurality of antennas 410. BB precoding unit 406 precodes $N_s$ data streams onto signals for transmission by the antennas 410. For example, in some embodiments, BB precoding unit 406 may include transmit path circuitry as described with regard to transmit path circuitry 200 in FIG. 2. The transmitter 402 further includes a controller 412 that controls the BB precoding unit 406 and a plurality of transmitter RF signal processing chains 408 as will be described in greater detail below.

As illustrated, each of the transmitter RF signal processing chains 408 apply different phase shifts 414 (i.e., $F_{RF}$ phase shifts) to the RF signals prior to transmission by the different antennas 410. In transmitter 402, there are $N^t_{RF}$ transmitter RF signal processing chains 408, where $N^t_{RF}$ is a positive integer, t indicates transmitter side and RF indicates that the chains process RF signals. For example, there may be any different number of $N^t_{RF}$ transmitter RF signal processing chains 408. In transmitter 402, there are $N_t$ antennas 410, where $N_t$ is a positive integer and t indicates transmitter side. In some embodiments, there may be more antennas 410 than transmitter RF signal processing chains 408 and more transmitter RF signal processing chains 408 than data streams (i.e., $N_s < N^t_{RF} < N_t$).

In this illustrative embodiment, the receiver 404 includes BB combiner unit 416, a plurality of receiver RF signal processing chains 418, and a plurality of antennas 420. BB combiner unit 416 combines down converts RF signals and decodes and demodulates the signals at baseband to produce the $N_s$ data streams transmitted by the transmitter 402. For example, in some embodiments, BB combiner unit 416 may include receive path circuitry as described with regard to receive path circuitry 300 in FIG. 3. The receiver 404 further includes a processing unit 422 that calculates precoding and combiner matrices and controls the BB combiner unit 416 and receiver RF signal processing chains 418 as will be described in greater detail below.

As illustrated, each of the receiver RF signal processing chains 418 apply different phase shifts 424 (i.e., $W_{RF}$ phase shifts) to the RF signals after receipt of the RF signals by the different antennas 420. In receiver 404, there are $N^r_{RF}$ receiver RF signal processing chains 418, where $N^r_{RF}$ is a positive integer, r indicates receiver side and RF indicates that the chains process RF signals. For example, there may be any different number of $N^r_{RF}$ transmitter RF signal processing chains 408. In receiver 404, there are $N_r$ antennas 420, where $N_r$ is a positive integer and r indicates transmitter side. In some embodiments, there may be more antennas 420 than receiver RF signal processing chains 418 and more receiver RF signal processing chains 418 than data streams (i.e., $N_s < N^r_{RF} < N_r$).

As used herein, baseband processing may be viewed as any type of digital processing, and RF processing may generally refer to analog processing of signals. While various embodiments are described as applying the phase shifts at RF, in other embodiments, the transmitter 402 and/or the receiver 404 may, instead of applying phase shifts at RF, apply phase shifts at some intermediate frequency (IF). As both implementations (RF processing and IF processing of analog signals) may lead to the same result (applying a phase shift), some embodiments of the present disclosure may apply analog phase shifts in a domain other than RF (e.g., IF).

As used herein, the following notations have the following meanings: A is a matrix; a is a vector; a is a scalar; $A^{(i)}$ is the $i^{th}$ column of A and $a_i$ is the $i^{th}$ element of a; $A^{(-i)}$ is the matrix A with the $i^{th}$ column removed; $A^*$ and $a^*$ are the conjugate transpose of A and a respectively, whereas $A^T$ and $a^T$ are their transposes; $\|A\|_F$ is the Frobenius norm of A and $|A|$ is its determinant; $\|a\|$ is the 2-norm of a; $A \otimes B$ is the Kronecker product of A and B; [A|B] denotes horizontal concatenation; diag(a) is a matrix with the elements of a on its diagonal; $I_N$ and $0_{N \times N}$ are the N×N identity and zero matrices respectively; CN(a,A) is a complex Gaussian vector with mean a and covariance matrix A.

Various embodiments of the present disclosure recognize that hardware constraints on RF processing chains may limit the amount of precoding capable of being performed at RF to that of phase shifting. Phase shifting is relatively easy to implement in hardware. Given the need for multiple RF chains in receivers and transmitters, limiting the amount of hardware needed in the RF chain may be advantageous in various embodiments.

In the constrained architecture illustrated in FIG. 4, the transmitter 402 first applies an $N^t_{RF} \times N_s$ baseband precoder (i.e., $F_{BB}$) followed by an $N_t \times N^t_{RF}$ RF precoder, (i.e., $F_{RF}$). A signal transmitted by the transmitter may be expressed according to equation 1 below:

$$x = F_{RF} F_{BB} s, \qquad \text{(Equation 1)}$$

where s is the $N_s \times 1$ symbol vector such that $E[ss^*] = I_{Ns}$. Since the RF precoder is implemented using analog phase shifters, $F^{(i)}_{RF} F^{(i)*}_{RF})_{k,k} = N_t^{-1}$, where $(\ldots)_{k,k}$ denotes the $k^{th}$ diagonal element, i.e. elements of $F_{RF}$ have constant norm. The total power constraint is enforced by setting $|F_{RF} F_{BB}|_F^2 = 1$ resulting in E[trace $(F_{RF} F_{BB} ss^* F_{BB}^* F_{RF^*})] = 1$, and no other constraints may be placed on the flexible baseband precoder.

A block-fading narrowband propagation channel may yield a received signal expressed in accordance with equation 2 below:

$$y = \sqrt{\rho} H F_{RF} F_{BB} s + n, \qquad \text{(Equation 2)}$$

where y is the $N_r \times 1$ received vector, H is the $N_r \times N_t$ channel matrix such that $E[|H|_F^2] = N_t N_r$, $\rho$ represents the average received power, and n is the vector of i.i.d $CN(0, \sigma_n^2)$ noise. The present disclosure implicitly assumes perfect timing and frequency recovery. Moreover, the present disclosure assumes that H is known to both transmitter 402 and receiver 404. Transmitter side information can be obtained via limited feedback. Additional description of the relevant channel model is discussed below.

At the receiver 404, $N^r_{RF} > N_s$ RF chains are used to receive the $N_s$ data stream. The processed signal may be expressed according to equation 3 below:

$$\tilde{y} = \sqrt{\rho} W_{BB}^* W_{RF}^* H F_{RF} F_{BB} s + W_{BB}^* W_{RF}^* n, \qquad \text{(Equation 3)}$$

where $W_{RF}$ is the $N_r \times N^r_{RF}$ RF combining matrix with unit norm entries, and $W_{BB}$ is the $N^r_{RF} \times N_s$ baseband combining matrix. The achieved rate assuming Gaussian signaling may be expressed according to equation 4 below:

$$R = \log_2(|I_{N_a} + \rho R_n^{-1} W_{BB}^* W_{RF}^* H F_{RF} F_{BB}^* F_{RF}^* H^* W_{RF} W_{BB}|) \qquad \text{(Equation 4)}$$

where $R_n = (\sigma_n^2 W_{BB}^* W_{RF}^* W_{RF} W_{BB})$ is the covariance matrix of the colored Gaussian noise at the output of the baseband combiner.

While pathloss and shadowing capture long-term channel statistics, transmitters may adapt to the channel at a much faster time scale governed by fading. While analytical models, such as Rayleigh fading, are amenable to capacity and beamforming analysis, they represent scattering levels that are unrealistically rich for mmWave channels. The present disclosure describes a parameterized channel model. For simplicity of exposition, each scattering cluster around the transmitter 402 and receiver 404 may be assumed to contribute a single propagation path. This is reasonable since most objects act as reflectors, rather than scatters, for example, due to the small wavelength of mmWave systems.

This assumption can be relaxed in the numerical analysis to allow clustered rays with correlated parameters. The discrete time narrowband channel after pulse shaping and sampling may be expressed according to equation 5 below:

$$H = \sqrt{\frac{N_t N_r}{L}} \sum_{\ell=1}^{L} \alpha_\ell a_r(\phi_\ell^r, \theta_\ell^r) a_t(\phi_\ell^t, \theta_\ell^t)^*. \quad \text{(Equation 5)}$$

where L is the number of rays, $\alpha_l$ is the "complex gain" of the $l^{th}$ ray, and $\phi_l^r(\theta_l^r)$ and $\phi_l^t(\theta_l^t)$ are the azimuth (elevation) angles of arrival and departure respectively. The vectors $a_r(\phi_l^r,\theta_l^r)$ and $a_t(\phi_l^t,\theta_l^t)$ represent the normalized receive and transmit array response vectors at an azimuth (elevation) angle $\phi_l^r(\theta_l^r)$ and $\phi_l^t(\theta_l^t)$, respectively.

For an N-element uniform linear array on the y-axis, the array response vector may be expressed according to equation 6 below:

$$a^{ULAy}(\phi) = \frac{1}{\sqrt{N}}[1, e^{jkd\sin(\phi)}, \ldots, e^{j(N-1)ksd\sin(\phi)}]^T \quad \text{(Equation 6)}$$

where $$k = \frac{2\pi}{\lambda}$$

and d is the inter-element spacing. The present disclosure does not include $\theta$ in the arguments of $a^{UKAy}(\phi)$ as the response for such a ULA is independent of the elevation angle. All results carry over to arrays on the z or x-axes, (i.e. considering the y-axis is without loss of generality). Small form factors, however, may make large linear arrays impractical. For this reason, the present disclosure considers uniform planar arrays which may yield realistic antenna dimensions and enable beamforming in elevation. For a uniform planar array in the yz-plane with W and H elements on the y and z axes respectively, the array response vector may be expressed according to equation 7 below:

$$a^{UPA}(\phi, \theta) = \frac{1}{\sqrt{N}} \quad \text{(Equation 7)}$$
$$([1, \ldots, e^{jkd(m\sin(\phi)\sin(\theta)+n\cos(\theta))}, \ldots, e^{jkd((W-1)\sin(\phi)\sin(\theta)+(H-1)\cos(\theta))}])^T$$

where $0 \leq m \leq W-1$ and $0 \leq n \leq H-1$ are the y and z index of an antenna element respectively, and $N=WH$.

Precoders are often designed to maximize the data rate achieved. The achieved data rate may be expressed according to equation 8 below:

$$(F_{RF}^{opt}, F_{BB}^{opt}) = \quad \text{(Equation 8)}$$
$$\arg\max_{F_{RF} \in W, F_{BB}} \log_2\left(\left|I_{N_r} + \frac{1}{\sigma_n^2} H F_{RF} F_{BB} F_{BB}^* F_{RF}^* H^*\right|\right)$$

Optimal precoding solutions for the single user channel are based on the channel's singular-value decomposition (SVD). Such precoders may employ arbitrary magnitudes and phases to the signal at each antenna which, in general, requires an equal number of RF chains. However, this precoding may not be possible when RF precoding is hardware constrained to phase shifting. SVD provides a well-defined performance upper bound that may be achievable according to the principals of the present disclosure.

The mutual information achieved by a suboptimal unitary precoder $\tilde{F}$ can be lower bounded as a function of the Fubini study distance from the optimal unitary precoder. The lower bound may be expressed according to Equation 9 below:

$$R(\tilde{F}) \geq \log_2(|F_{opt}^* \tilde{F}|^2) + \sum_{i=1}^{N_s} \log_2\left(1 + \frac{\sigma_i^2}{\sigma_n^2}\right), \quad \text{(Equation 9)}$$

where $F^{opt}$ is the unitary matrix obtained from the right singular vectors of the channel. Therefore, while perfect SVD-based precoding may not be possible for mmWave systems, the above bound on achieved rate may provide a criterion for constrained precoders with good performance. For example, the optimal MIMO limited feedback codebook, known as the Grassmannian codebooks, directly targets maximizing $|F_{opt}^* \tilde{F}|^2$, and thereby attempts to minimize the rate loss upper bound above. The present disclosure seeks to minimize the "distance" between the optimal precoder, $F_{opt}$, and the effective layered precoders, $F_{RF}$ and $F_{BB}$.

The present disclosure considers an alternative objective function. Namely, the present disclosure considers jointly designing baseband and RF precoders by solving the following equation 10 below:

$$(\hat{F}_{RF}, \hat{F}_{BB}) = \arg\min \|F_{opt} - F_{RF} F_{BB}\|_F,$$

$$s.t. F_{RF} \in W, \|F_{RF} F_{BB}\|_F^2 = N_s \quad \text{(Equation 10)}$$

where W is the set of matrices with beam steering columns, i.e. columns of the $a(\phi,\theta)$. The present disclosure solves a more constrained version of the above problem in which $F_{RF}$ is further constrained to having columns from a finite channel dependent set of known candidate columns. The intuition behind further restricting the columns of $F_{RF}$ is that SVD precoding, which is often accurately called maximum ratio transmission, can be thought of as being an "optimal" combination of the signals travelling along the various propagation paths.

The present disclosure approximates the optimal precoder by selecting $N_{RF}^t$ beam steering vectors from the candidate set $\{a_t(\phi_k^t, \theta_k^t)/\sqrt{N_t}, k=1, \ldots, L\}$ which constitute the columns of $A_t$. After the selection is made, the $N_{RF}^t$ vectors are optimally combined at baseband. The resulting precoder is a baseband combination of only $N_{RF}^t$ beam steering vectors and can be implemented in the transmitter 402 in FIG. 4. As a result, the present disclosure simplifies the problem to choosing the optimal $N_{RF}^t$ vectors from the set of candidate RF beamformers and then finding the corresponding optimal baseband precoder. This problem may be expressed according to equation 11 below:

$$(\hat{F}_{RF}, \hat{F}_{BB}) = \arg\min \|F_{opt} - F_{RF} F_{BB}\|_F,$$

$$s.t. F_{RF}^{(i)} \in \{a_t(\phi_k^t, \theta_k^t)/\sqrt{N_t}, k=1, \ldots, L\},$$
$$\|F_{RF} F_{BB}\|_F^2 = N_s \quad \text{(Equation 11)}$$

where the constraint on $F_{RF}^{(i)}$ means that the columns of $F_{RF}$ must come from the set of normalized array response vectors $\{a_t(\phi_k^t, \theta_k^t)/\sqrt{N_t}, k=1, \ldots, L\}$. This seemingly complex layered selection/combination problem, however, can be written in a simpler form. Namely, the constraints on $F_{RF}$, along with the selection process, can be incorporated directly into the objective function. This can be done by writing the problem according to Equation 12 below:

$$\hat{F}_{BB} = \arg\min_{F_{BB}} \|F_{opt} - \tilde{A}_t F_{BB}\|_F$$

$$s.t. \|\text{diag}(F_{BB} F_{BB}^*)\|_0 = N_{RF}^t, \|\tilde{A}_t F_{BB}\|_F^2 = N_s \quad \text{(Equation 12)}$$

where $\tilde{A}_t$ is the matrix of normalized array response vectors.

The constraint on $F_{BB}$ now states that $F_{BB}$ may not have more than $N^t_{RF}$ rows with non-zero elements, and thus may not "select" more than $N^t_{RF}$ RF beamforming vectors. Therefore, by optimizing the "sparse" matrix $F_{BB}$, the present disclosure may jointly select the best RF beamforming vectors as well as the corresponding baseband precoder, i.e. the baseband precoder will be the non-zero rows of $F_{BB}$, and the RF precoder $F_{RF}$ will be the corresponding columns of $\tilde{A}_t$.

Essentially, the present disclosure formulates the problem of jointly designing the layered precoder into a "sparsely constrained" matrix least squares problem. For example, in the single stream or $N_s=1$ case, the problem may be may be expressed according to equation 13 below:

$$\hat{f}_{BB} = \arg\min \|f_{opt} - \tilde{A}_t f_{BB}\|_F$$

$$s.t. \|f_{BB}\|_0 = N_{RF}^t, \|\tilde{A}_t f_{BB}\|_F^2 = 1 \quad \text{(Equation 13)}$$

which can be immediately expressed in standard form for sparsity constrained optimization. Lower case letters have been used here to highlight the fact that the variables are now vectors. Relaxing the power constraint for now, the l2-l1 relaxation of the original problem may be expressed according to equation 14 below:

$$\hat{f}_{BB} = \underset{f_{BB}}{\arg\min} \|f_{opt} - \tilde{A}_t f_{BB}\|_F + \lambda^* \|f_{BB}\|_1, \quad \text{(Equation 14)}$$

where $\lambda^*$ is chosen to achieve the needed sparsely level. Therefore, in the beamforming case, constrained least squares algorithms may be used to solve the relaxed problem above.

The present disclosure provides an algorithmic solution to the precoding problem of low complexity precoding via Frobenius norm minimization. The precoding algorithm is based on the concept of orthogonal matching pursuit and is applicable to the case of $N_s>1$ or $N_s=1$. One example of pseudo-code for the precoder solution is given in Algorithm 1 as shown in Table 1 below. The precoding algorithm starts by finding the propagation path along which the optimal precoder has the maximum projection and appends the column to the RF precoder $F_{RF}$. After the dominant array response vector is found, its contribution is removed, and the algorithm proceeds to find the column along which the "residual precoding matrix" has the largest projection. The process continues until all $N^t_{RF}$ beamforming vectors have been selected. At the end of the $N^t_{RF}$ iterations, the algorithm would have: 1) constructed an $N_t \times N^t_{RF}$ RF precoding matrix $F_{RF}$, and 2) found the optimal $N^t_{RF} \times N_s$ baseband precoder $F_{BB}$, which minimizes the residual Frobenius norm. Finally, the total power constraint is enforced in step 10.

Table 1 below illustrates an algorithm (i.e., Algorithm 1) to jointly design $F_{RF}$ and $F_{BB}$ via orthogonal matching pursuit in accordance with various embodiments of the present disclosure.

TABLE 1

Algorithm 1 Sparse Precoder Reconstruction via Orthogonal Matching Pursuit

Require: $F_{opt}$
1:    $F_{RF}$ = Empty Matrix
2:    $F_{res} = F_{opt}$
3:    for $i \leq N_{RF}^t$ do
4:        $\Psi = \tilde{A}_t^* F_{res}$
5:        $k = \arg\max_{l=1,\ldots,L} (\Psi\Psi^*)_{l,l}$
6:        $F_{RF} = [F_{RF} | \tilde{A}_t^{(k)}]$
7:        $F_{BB} = (F_{RF}^* F_{RF})^{-1} F_{RF}^* F_{opt}$ 8:        $F_{res} = \dfrac{F_{opt} - F_{RF} F_{BB}}{\|F_{opt} - F_{RF} F_{BB}\|_F}$ 9:    end for 10:   $F_{BB} = N_s \dfrac{F_{BB}}{\|F_{RF} F_{BB}\|_F}$ 11:   return $F_{RF}$, $F_{BB}$ In the description of the precoder design above, the operation of the receiver was not considered or was effectively assumed to be able to apply a maximum ratio combiner to the received signal and "gather" the power received in all "directions". If this is not the case, then attempting to approximate an optimal precoder without consideration of the parameters of the receiver may yield undesired effects. For example, if a receiver with a single RF chain attempts to receive a single data stream and is restricted to applying a beam steering vector, separately designing the precoder to approximate $F^{opt}$ and radiate power in several directions leads to a loss in actual received power. As a result, for a constrained receiver, the precoder design may need to account for the combiner used, and vice versa.

To resolve this issue, the orthogonal matching pursuit concept described above may be used to find a combining matrix that can be implemented by the receiver 404. In one example, the combiner algorithm may be represented in the pseudo code for Algorithm 2 in Table 2 below.

TABLE 2

Algorithm 2 Sparse Combiner Reconstruction via Orthogonal Matching Pursuit

Require: $U_{opt}$
1:    $W_{RF}$ = Empty Matrix
2:    $U_{res} = U_{opt}$
3:    for $i \leq N_{RF}^r$ do
4:        $\Psi = \tilde{A}_r^* U_{res}$
5:        $k = \arg\max_{l=1,\ldots,L} (\Psi\Psi^*)_{l,l}$
6:        $W_{RF} = [W_{RF} | \tilde{A}_r^{(k)}]$
7:        $W_{BB} = (W_{RF}^* W_{RF})^{-1} W_{RF}^* U_{opt}$ 8:        $U_{res} = \dfrac{U_{opt} - W_{RF} W_{BB}}{\|U_{opt} - W_{RF} W_{BB}\|_F}$ 9:    end for
10:   return $W_{RF}$, $W_{BB}$ To address the receiver constraint issues, the present disclosure may first consider which of the transmitter 402 and the receiver 404 has fewer RF signal processing chains. The precoder and combiner algorithms may be run in succession at the receiver 404 according to the rules in equation 15 below:

$$N_{RF}^t > N_{RF}^r \begin{cases} 1. \text{ Solve } & W_{RF}W_{BB} \approx U_{opt} \\ 2. \text{ Solve } & F_{RF}F_{BB} \approx H^* W_{RF}^* W_{BB}^* \end{cases} \quad \text{(Equation 15)}$$

$$N_{RF}^t < N_{RF}^r \begin{cases} 1. \text{ Solve } & F_{RF}F_{BB} \approx F_{opt} \\ 2. \text{ Solve } & W_{RF}W_{BB} \approx HF_{RF}F_{BB} \end{cases}$$

As a result of equation 15 above, embodiments of the present disclosure start with the more constrained side (i.e., the side with fewer RF signal processing chains). The precoding or combining matrix of the more constrained side is found first using orthogonal matching pursuit. Given the output, the remaining precoder or combiner then directly approximates the resulting optimal matched filter. If the receiver and the transmitter have the same number of RF chains, the processing unit 422 in the receiver 404 may calculate either the precoding or combining matrix first.

Calculating precoders and combiners implicitly assumes that the device (e.g., the processing unit 422 at the receiver 404) doing the calculation has knowledge of the channel matrix H. In systems with large antenna arrays, the channel matrix "H" may have very high dimensions. However, the channel may actually have few variables. So long as the receiver 404 can estimate the angles of arrival and departure and complex gains associated with the various paths in the channel, then the receiver 404 can reconstruct the matrix H without ever explicitly estimating the channel matrix H's individual entries. In some embodiments, channel estimation information is obtained at the receiver with the aid of training or reference signals. These signals are sometimes referred to as Channel State Information Reference Signals (CSI-RS). At the output of the channel estimation and training phase, the processing unit 422 in the receiver 404 can calculate the precoders and combiners. Since precoders are to be used at the transmitter, however, the transmitter 402 must acquire similar knowledge. This is often achieved through feedback.

Upon calculation of the RF and BB precoding matrices, the receiver 404 may feed back information about the precoding matrices to the transmitter 402 for use in future transmissions. More accurately, the RF and BB precoding matrices are calculated at the receive end and then are fed back by a transmitter at the receive end to a receiver at the transmit end. For example, wireless communication system 400 may include separate feedback transceivers at the receive and transmit ends. In other examples, a transmitter associated with the receiver 404 (e.g., in the same base station, relay station, or subscriber station) may transmit the message to a receiver associated with the transmitter 402 (e.g., in the same base station, relay station, or subscriber station). In various embodiments, the transmitter associated with the receiver 404 may be implemented similarly to transmitter 402, and the receiver associated with the transmitter 402 may be implemented similarly to receiver 404.

The information fed back to the transmitter 402 may be the matrices themselves. However, in various embodiments, to reduce feedback overhead, the processing unit 422 may associate the calculated RF and BB precoding matrices to respective matrix identifiers in a codebook. In these embodiments, the receiver 404 may feed back only the matrix identifiers for the RF and BB precoding matrices.

In cellular standards, such as long term evolution (LTE), feedback from the receiver to the transmitter has several forms. Feedback elements that are relevant to precoding are quantities, such as a Rank Indicator (RI), a Precoding Matrix Indicator (PMI), and a Channel Quality Index (CQI). The rank indicator defines the maximum number of streams that can be supported, whereas the PMI defines the preferred candidate precoding vectors or matrix. However, the precoding method provided in the present disclosure has a fundamental impact on feedback signaling since the precoding now is split into two layers, RF processing and baseband processing. Accordingly, some embodiments of the feedback structure used in conjunction with the precoding strategy of the present disclosure are illustrated in FIG. 5.

Figure 5:
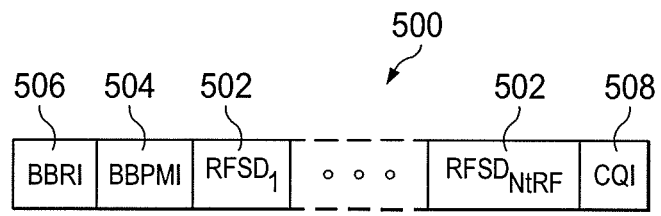
FIG. 5 illustrates a block diagram of an exemplary feedback frame structure in accordance with an embodiment of the present disclosure.

FIG. 5 illustrates a block diagram of an exemplary feedback frame structure in accordance with an embodiment of the present disclosure. Feedback frame structure 500 is one example of a feedback message that may be fed back to the transmitter 402 to indicate the RF and BB precoding matrices to be used in transmissions.

As illustrated, feedback frame structure 500 includes RF Steering Directions (RFSD) fields 502. The RFSD fields 502 indicate the azimuth and elevation angles that are to be used by the transmitting in the RF precoding matrix $F_{RF}$. Since the transmitter 402 has a number of RF signal processing chains 408, the receiver 404 will inform the transmitter 402 of a steering direction to be used at each of the RF signal processing chains 408.

Feedback frame structure 500 includes a Baseband Precoder Matrix Indicator (BBPMI) field 504. The present disclosure combines a number of steering directions via a baseband precoder. Information about the preferred precoder matrix to be used by the transmitter for baseband processing is encoded in the BBPMI field 504.

Feedback frame structure 500 includes Baseband Rank Indicator (BBRI) field 506. The BBRI field 506 indicates the maximum number of data streams supported by the receiver 404.

Feedback frame structure 500 includes Channel Quality Index (CQI) field 508. This CQI field 508 carries information about the resulting channel quality and could be used for transmitter side decisions. For example, without limitation, this information may include scheduling and rate adaptation. In some embodiments, CQI field 508 may not be necessary to include in the feedback frame structure 500.

The above feedback quantities lie in a continuous space. Therefore, to enable efficient feedback, a form of quantization may be applied. The wireless communication system 400 may utilize quantization codebooks to map the scalar and matrix quantities defined to a finite set of feedback symbols. For example, a scalar codebook may be used to quantize the angles in the RFSD fields 502 and another feedback matrix codebook can be used to quantize the baseband precoding matrix in BBPMI field 504. The quantization could be performed at the output of the precoding algorithms or incorporated directly into the algorithm. To incorporate the quantization of steering directions directly in the algorithm, for example, the matrix $A_t$ defined in the algorithm can be populated by array response vectors in the quantized directions, for example, instead of the angles present in the channel.

The illustration of feedback frame structure 500 in FIG. 5 is intended as an illustrative example, and not intended to imply any physical or structural limitations on the various embodiments of the present disclosure.

As shown in FIG. 4, each of the transmitter RF signal processing chains 408 is connected to each of the antennas 410, and each of the receiver RF signal processing chains 418 is connected to each of the antennas 420. However, in other embodiments, the RF signal processing chains may be connected to a set of antennas.

Figure 6:
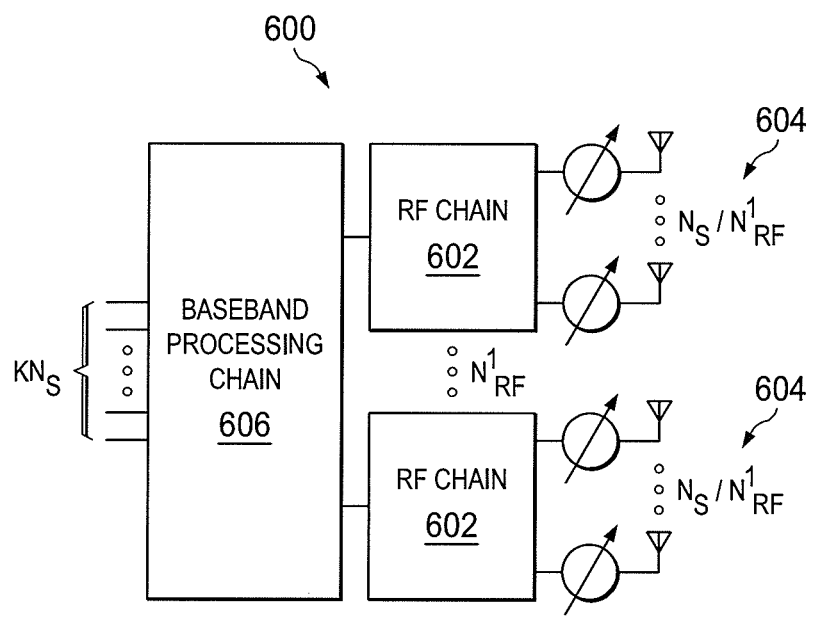
FIG. 6 illustrates a block diagram of a signal processing device including RF chains connected to a set of antennas in accordance with an embodiment of the present disclosure.

FIG. 6 illustrates a block diagram of a signal processing device including RF chains connected to a set of antennas in accordance with an embodiment of the present disclosure.

The signal processing device 600 in FIG. 6 may be a transmitter or receiver that implements combined baseband processing and RF beam steering as described in FIG. 4 above. However, in this illustrative embodiment, RE signal processing chains 602 are connected to a subset of the antennas 604 for the signal processing device 600. For example, each of the RF signal processing chains 602 may use a separate subset of the antennas 604 to steer beams in a given direction.

In this illustrative embodiment, the signal processing device 600 includes a layered RF/Baseband signal processing where the RF signal processing chains 602 allows the signal processing device 600 to steer the output of each RF signal processing chain 602 in a given direction, and the baseband processing chain 606 allows mixing the input of the various RF signal processing chains 602. In this illustrative embodiment, some minor modifications to the precoding algorithms described above may be made. For example, the fact that each RF signal processing chain 602 is only connected to a subset of the antennas 604 mathematically translates some of the elements of $F_{RF}$ being equal to 0. More specifically, if antenna is not connected to RF chain j in the receiver or transmitter, then the $(i,j)^{th}$ of $F_{RF}$ must be 0. To accommodate this architecture, the present disclosure may, for example, set the corresponding elements of $F_{RF}$ to 0 after one has found the "unconstrained" solution applicable to the wireless communication system 400 in FIG. 4.

Figure 7:
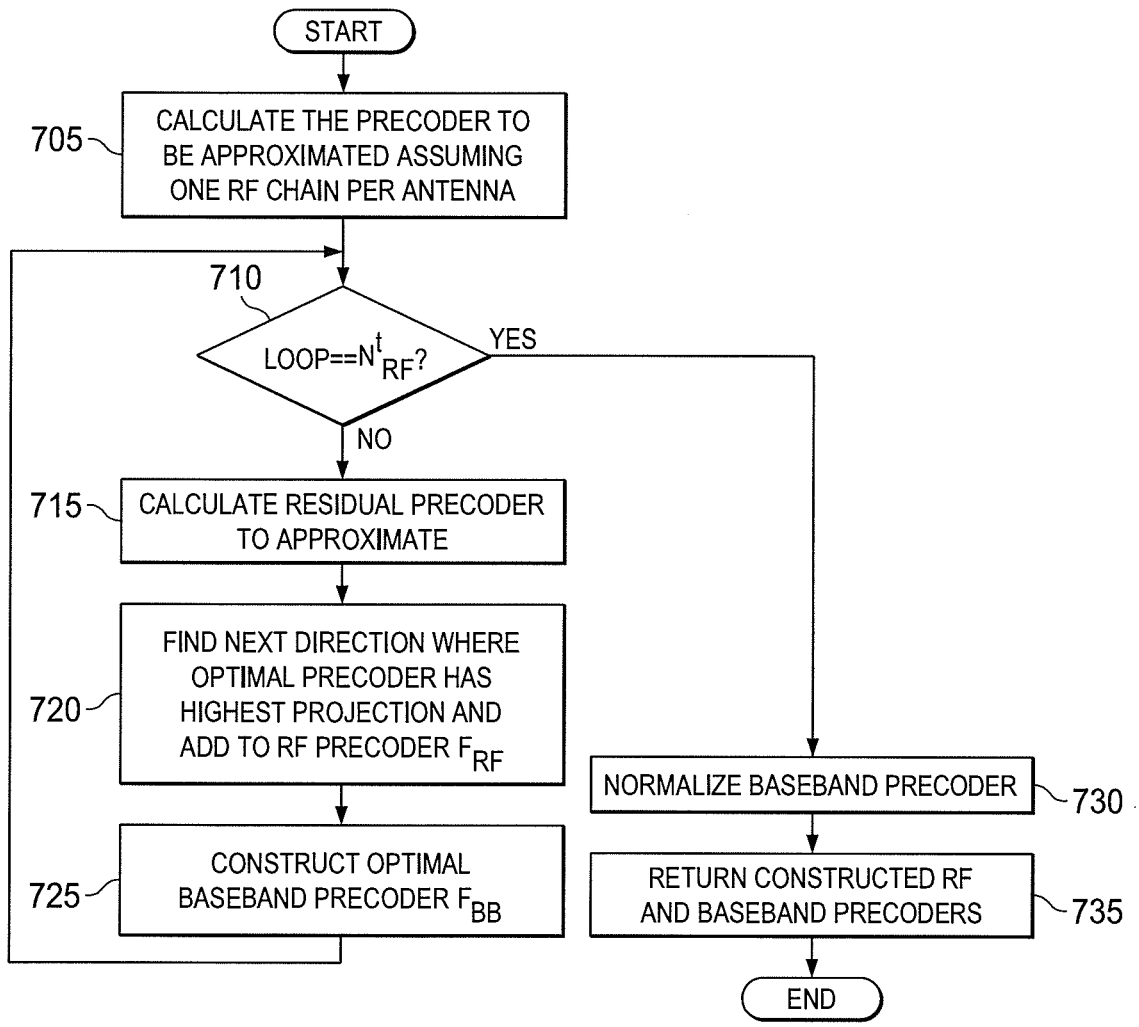
FIG. 7 illustrates a process for calculating precoder matrices in accordance with various embodiments of the present disclosure.

FIG. 7 illustrates a process for calculating precoder matrices in accordance with various embodiments of the present disclosure. For example, the process depicted in FIG. 7 may be performed by the processing unit 422 in the receiver 404 in FIG. 4. The receiver 404 may calculate precoder matrices in accordance with the principals and equations described above.

The process begins by calculating the precoder matrix to be approximated assuming 1 RF chain per antenna (step 705). The process then determines whether the $N^t_{RF}$ directions have been calculated (step 710). For example, the process may determine whether an RF precoder for each of the RF chains in the transmitter has been calculated.

If the number calculated is not equal to the number of RF chains in the transmitter, the process calculates the residual precoder to approximate (step 715). For example, the process calculates the precoder for a direction that has yet to be calculated.

The process then finds a next direction where the optimal precoder has a highest projection and adds the found direction to the RF precoder $F_{RF}$ (step 720). The process then constructs the optimal baseband precoder $F_{BB}$ (step 725), with the process returning to step 710 to continue to calculate precoders for each of the RF chains in the transmitter.

Returning to step 710, if the number calculated is equal to the number of RF chains in the transmitter, the process proceeds to normalize the baseband precoder (step 730). The process then returns the constructed RF and BB precoder matrices (step 735), with the process terminating thereafter.

Figure 8:
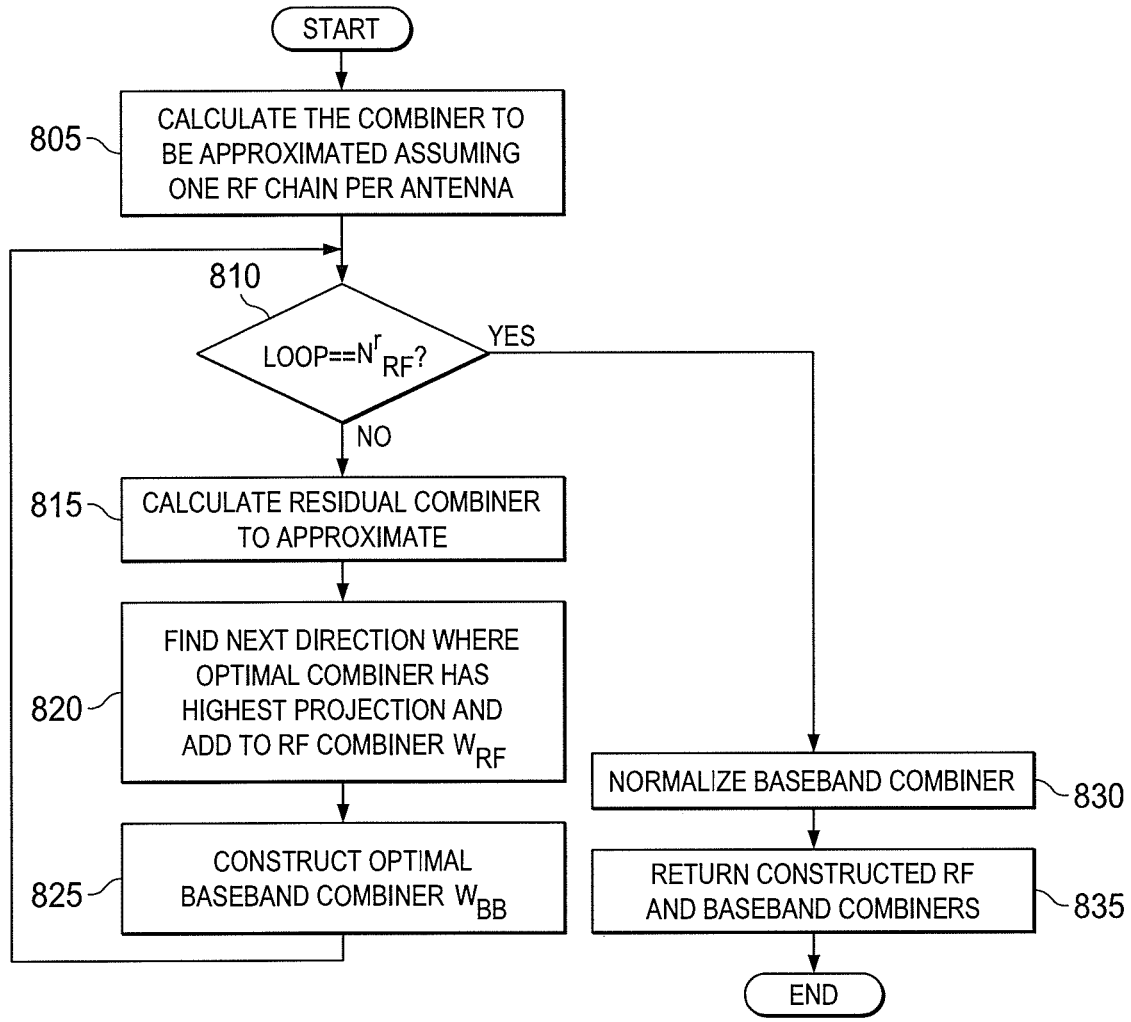
FIG. 8 illustrates a process for calculating combiner matrices in accordance with various embodiments of the present disclosure.

FIG. 8 illustrates a process for calculating combiner matrices in accordance with various embodiments of the present disclosure. For example, the process depicted in FIG. 8 may be performed by the processing unit 422 in the receiver 404 in FIG. 4. The receiver 404 may calculate, combiner matrices in accordance with the principals and equations described above.

The process begins by calculating the combiner matrix to be approximated assuming 1 RF chain per antenna (step 805). The process then determines whether the $N^r_{RF}$ directions have been calculated (step 810). For example, the process may determine whether an RF combiner for each of the RF chains in the receiver has been calculated.

If the number calculated is not equal to the number of RF chains in the receiver, the process calculates the residual combiner to approximate (step 815). For example, the process calculates the precoder for a direction that has yet to be calculated.

The process then finds a next direction where the optimal combiner has a highest projection and adds the found direction to the RF combiner $W_{RF}$ (step 820). The process then constructs the optimal baseband combiner $W_{BB}$ (step 825), with the process returning to step 810 to continue to calculate combiners for each of the RF chains in the receiver.

Returning to step 810, if the number calculated is equal to the number of RF chains in the transmitter, the process proceeds to normalize the baseband combiner (step 830). The process then returns the constructed RF and BB combiner matrices (step 835), with the process terminating thereafter.

Figure 9:
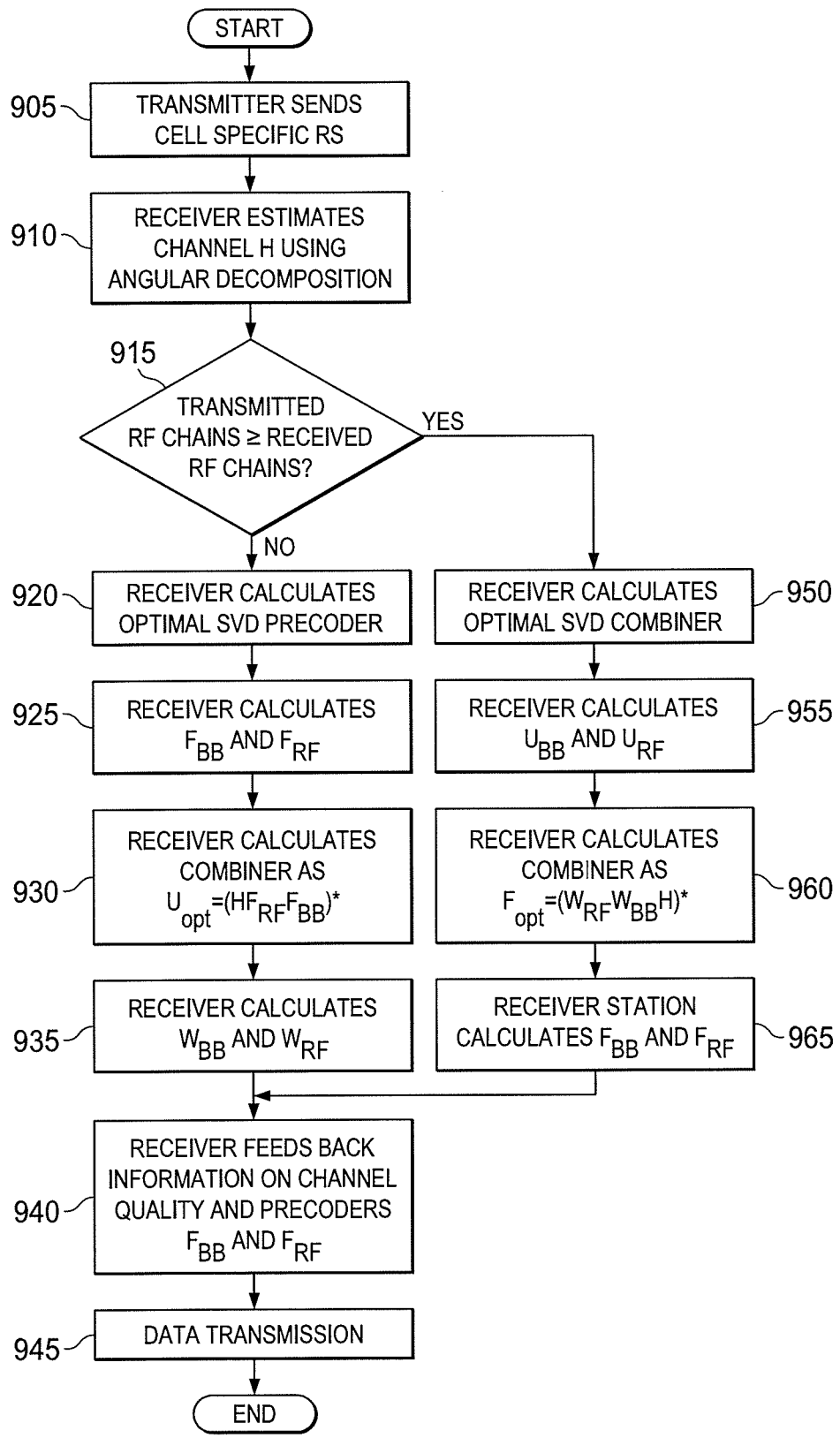
FIG. 9 illustrates a process for calculating combiner and precoder matrices in accordance with various embodiments of the present disclosure.

FIG. 9 illustrates a process for calculating combiner and precoder matrices in accordance with various embodiments of the present disclosure. For example, the process depicted in FIG. 9 may be performed by the transmitter 402 and the receiver 404 in the wireless communication system 400 in FIG. 4. FIG. 9 is an example of the operation of the wireless communication system 400 based on the rules and principals described above. For example, FIG. 9 describes steps of channel estimation and feedback and ordering in which precoders and combiners may be calculated based on the capabilities of the base station and subscriber station. The process illustrated in FIG. 9 may be implemented during either downlink or uplink communication.

The process begins with the transmitter sending a cell specific reference signal (step 905). The receiver estimates channel H using the channel's angular decomposition (step 910). The receiver determines whether the number of transmitter RF Chains is greater than or equal to the number of receiver RF Chains (step 915).

If the number of transmitter RF Chains is less than the number of receiver RF Chains, the receiver calculates optimal SVD precoder wished to be approximated (step 920). The receiver calculates $F_{BB}$ and $F_{RF}$ (step 925). The receiver calculates the combiner to be approximated as $U_{opt} = (HF_{RF}F_{BB})^*$ (step 930). The receiver station then calculates $W_{BB}$ and $W_{RF}$ (step 935). The receiver then feeds back information on channel quality and precoders $F_{BB}$ and $F_{RF}$ (step 940). Thereafter, data may be transmitted and received using the calculated precoders and combiners (step 945), with the process terminating thereafter.

Returning to step 915, if the number of transmitter RF Chains is greater than or equal to the number of receiver RF Chains, the receiver calculates the optimal SVD combiner to be approximated (step 950). The receiver then calculates $U_{BB}$ and $U_{RF}$ (step 955). The receiver then calculates the combiner to be approximated as $F_{opt} = (W_{RF}W_{BB}H)^*$ (step 960). The receiver then calculates $F_{BB}$ and $F_{RF}$ (step 965). The receiver then feeds back information on channel quality and precoders $F_{BB}$ and $F_{RF}$ (step 940).

Thereafter, data may be transmitted and received using the calculated precoders and combiners (step 945), with the process terminating thereafter.

Figure 10:
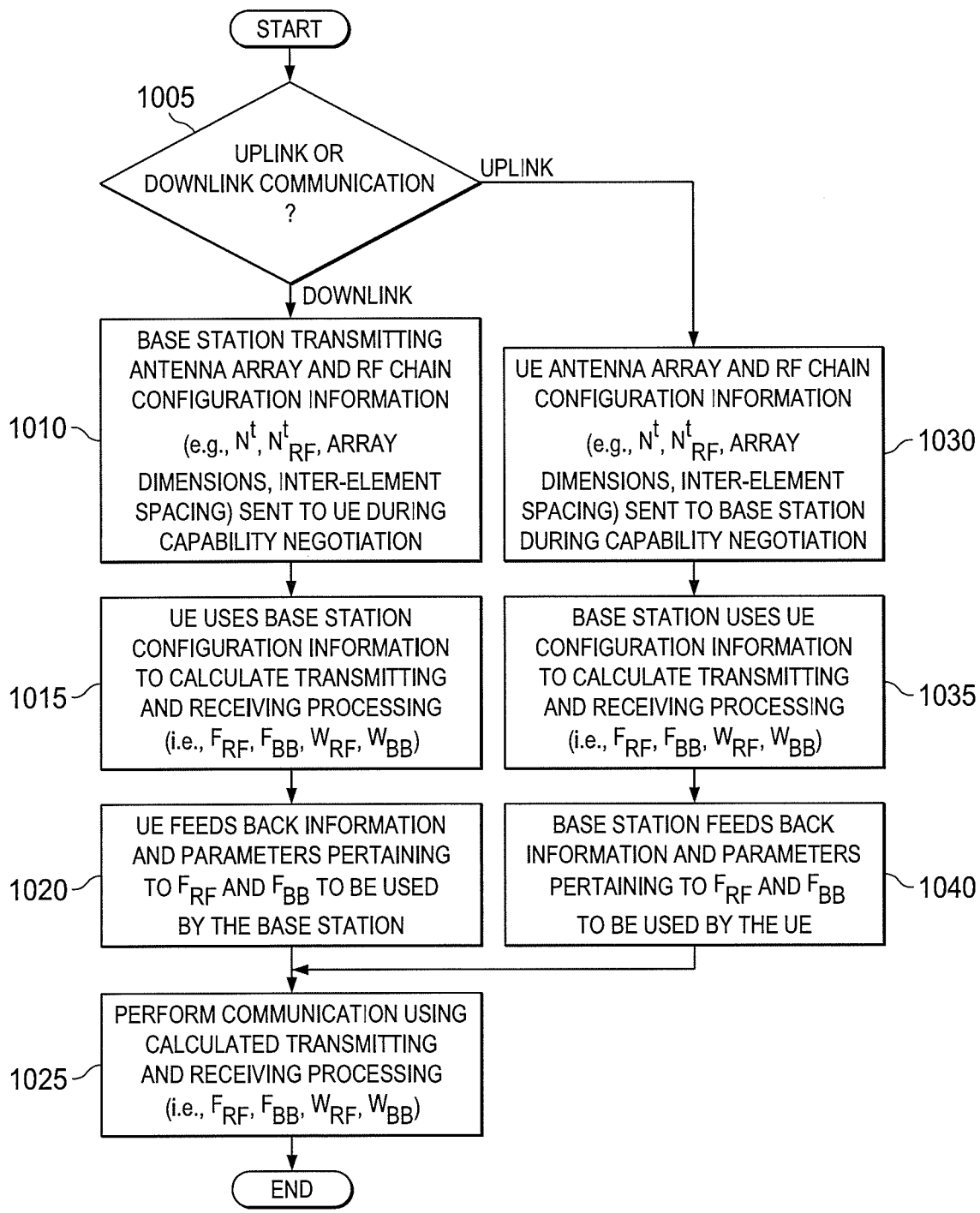
FIG. 10 illustrates a process for negotiating capability and configuration information to enable uplink and downlink precoding in accordance with various embodiments of the present disclosure.

FIG. 10 illustrates a process for negotiating capability and configuration information to enable uplink and downlink precoding in accordance with various embodiments of the present disclosure. For example, the process depicted in FIG. 10 may be performed by the transmitter 402 and the receiver 404 in the wireless communication system 400 in FIG. 4.

In addition to feedback to inform the transmitter of the preferred precoding matrix structure, since precoders are calculated at the receiver, precoding may require that the receiver have some basic knowledge of the transmitter configuration. For example, in the algorithms discussed above, the present disclosure assumes that the receiver 404 can form the matrix $A_t$ after the receiver 404 has acquired knowledge of the azimuth and elevation angles of departure. This implies that the receiver 404 knows information about the transmitter 402, such as, for example, without limitation, the number of antennas 410 at the transmitter 402, the dimensions of the antenna array (in case of multi-dimensional arrays), and the inter-element spacing. Moreover, to properly construct the baseband processing matrix or precoder, the receiver 404 may ideally need to know the number of RF chains at the transmitter. Since this information is static, the overhead of exchanging this information is low, and the exchange can be done through an initial capability and configuration negotiation phase.

FIG. 10 illustrates one embodiment of the initial capability and configuration negotiation phase. The process begins by determining whether uplink or downlink communication is to be performed (step 1005).

If the communication is in the downlink, the base station sends BS TX antenna array and RF chain configuration information (e.g., $N_t$, $N_t^{RF}$, Array dimensions, inter-element spacing) the UE during capability negotiation (step 1010). For example, to inform the UE of the base station's configuration, the base station could embed this information in broadcast channel (BCH) transmissions. Such information exchange can be explicit or can be made implicit if fields such as "user category" can be mapped to a known configuration.

The UE uses BS configuration information to calculate TX and RX processing, (i.e., $F_{RF}$, $F_{BB}$, $W_{RF}$, $W_{BB}$) (step 1015). The UE then feeds back information and parameters pertaining to $F_{RF}$ and $F_{BB}$ to be used by the base station (step 1020). Thereafter, the base station and UE perform communication using calculated TX and RX processing, (i.e., $F_{RF}$, $F_{BB}$, $W_{RF}$, $W_{BB}$) (step 1025), with the process terminating thereafter.

If the communication is in the uplink, the UE sends antenna array and RF chain configuration information (e.g., $N_t$, $N_t^{RF}$, Array dimensions, inter-element spacing) to the BS during capability negotiation (step 1030). For example, to inform the base station of the UE base station's configuration, the UE could embed this information in Random Access Channel (RACH) transmissions. Such information exchange can be explicit or can be made implicit if fields such as "user category" can be mapped to a known configuration.

The BS uses UE configuration information to calculate TX and RX processing, (i.e., $F_{RF}$, $F_{BB}$, $W_{RF}$, $W_{BB}$) (step 1035). The BS then feeds back information and parameters pertaining to $F_{RF}$ and $F_{BB}$ to be used by the UE (step 1040). Thereafter, the base station and UE perform communication using calculated TX and RX processing, (i.e., $F_{RF}$, $F_{BB}$, $W_{RF}$, $W_{BB}$) (step 1025), with the process terminating thereafter.

In various embodiments, some capability or configuration information may not be available or perfectly known. In these embodiments, precoding can still happen in much of the same way at the expense of lower data rate performance.

For example, if the number of RF chains is unknown and if the receiver assumes that the transmitter has fewer RF chains that the transmitter actually has, the transmitter can leave a few RF chains unused. If the receiver assumes the transmitter has more RF chains than the transmitter actually has, then the transmitter can neglect some of the less dominant (smaller magnitude) columns of the baseband precoding matrix and its corresponding steering angles.

In another example, if the receiver is not informed of the number of antennas available at the transmitter, the receiver can calculate precoders assuming a best estimate number of antennas. This estimate will affect the accuracy of the RF steering angles used in the RF precoder but result in a minimal loss in data rate. This estimate does, however, assume that the receiver still has some knowledge of array design, such as inter-element spacing and whether the array is linear, planar, or otherwise.

Similar modifications to the algorithms can be made in examples where the receiver does not have knowledge of antenna-array configuration information, such as inter-element spacing. The receiver can, for example, calculate precoders based on an assumed array configuration, and the transmitter can then apply a transformation to translate the feedback information from the assumed array information to the actual array configuration. For example, all that may be needed in RF precoding is the steering angles. The actual structure of the steering vectors may not be central to the performance of the precoder, provided that the correct steering vector structure is used at the end. Thus, some unknown information can be accounted for at the transmitter.

Although reference has been made above to narrowband millimeter waveband communications, various embodiments may be implemented in wideband and Orthogonal Frequency Division Multiplexing (OFDM) systems. For example, the concepts of steering multiple beams using RF processing and combining them at baseband can be extended to wideband frequency selective systems that use OFDM. Looking at the propagation channel seen on each subcarrier, all channels can be written as a linear combination of the same L channel paths. The coefficients of the different linear combinations are discrete Fourier transform (DFT) coefficients. Since the channel on each subcarrier is a different linear combination of the same channel paths, the precoders to be used on each subcarrier, therefore, will be highly correlated, and the favorable beam steering paths that would ideally be chosen for different subcarriers will, in all likelihood, be the same or similar.

To extend the precoding concept to such a channel, embodiments of the present disclosure modify the algorithm presented to select $N_t^{RF}$ paths that are preferred by most of the subcarriers, since the RF precoder needs to be common to all subcarriers. After selecting the candidate RF precoder, each subcarrier can apply a different baseband precoder that best approximates the subcarrier's optimal precoder or maximizes the data rate that the subcarrier can support. For example, the wireless communication system 400 may select a set of steering directions according to a modified selection rule. One example is that the precoding algorithm is run for all subcarriers, and the most common steering directions are selected for precoding. Other selection rules can be considered. Different baseband precoders are then calculated for each subcarrier.

Figure 11:
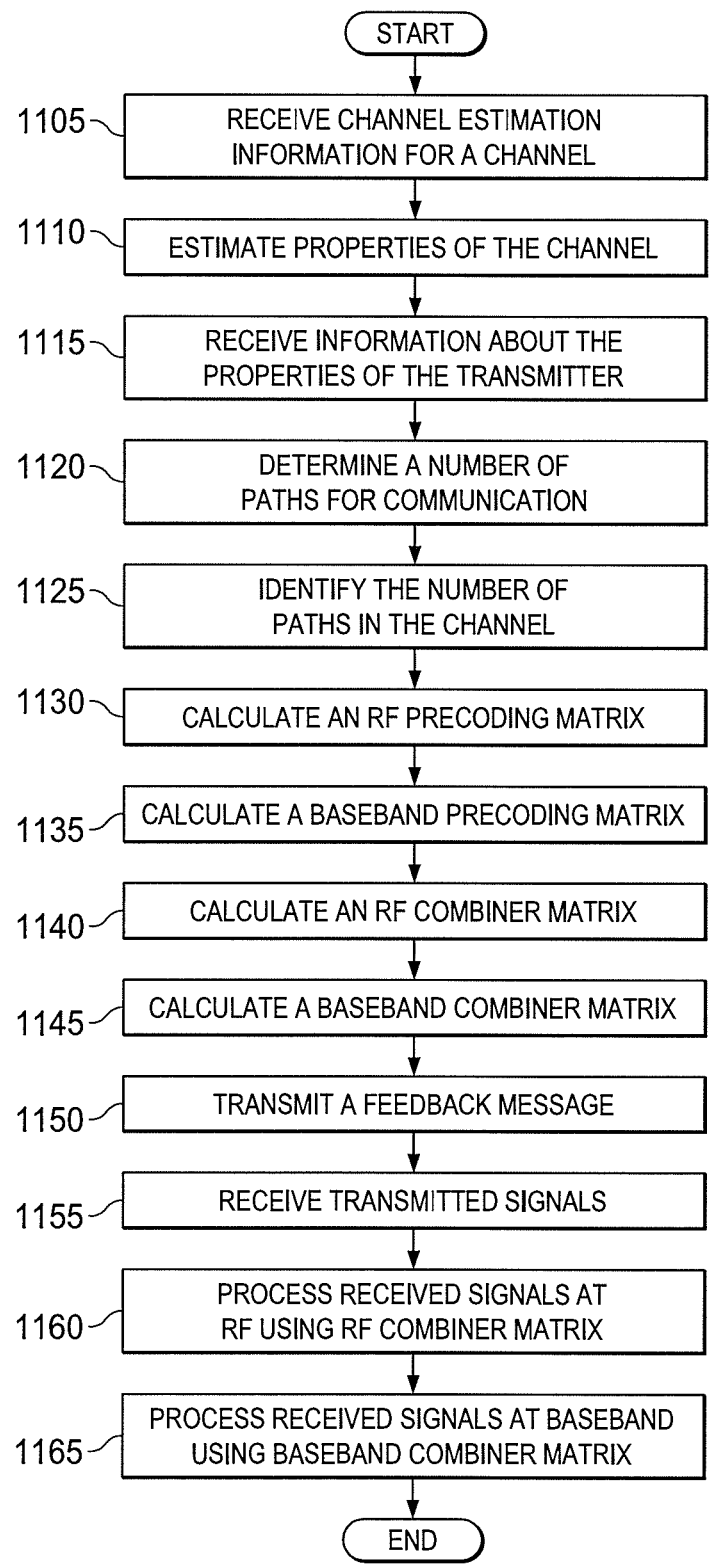
FIG. 11 illustrates a process for receiving signals using combined baseband and RF processing in accordance with various embodiments of the present disclosure.

FIG. 11 illustrates a process for receiving signals using combined baseband and RF processing in accordance with various embodiments of the present disclosure. For example, the process depicted in FIG. 11 may be performed by the processing unit 422 and the receiver 404 in FIG. 4. The process may be used in receiving uplink or downlink communication. For example, the receiver may be located in a base station, relay station or user equipment and may receive signals transmitted by a remotely-located transmitter.

The process begins by receiving channel estimation information for a channel (step 1105). For example, in step 1105, the channel estimation information may be a reference signal or CSI-RS. The process then estimates properties of the channel (step 1110). Thereafter, the process receives information about the properties of the transmitter (step 1115). For example, in step 1115, the receiver may receive information, such as, for example, without limitation, a number of antennas in the transmitter, a spacing of the antennas, and a number of RF signal processing chains in the transmitter, from the transmitter. This information may be received in the BCH.

The process then determines a number of paths for communication (step 1120). For example, the processing unit associated with the receiver may determine the number of paths for communication as the smaller of the number of RF signal processing chains in the transmitter and in the receiver. Thereafter, the process identifies the number of paths in the channel (step 1125). For example, in step 1125, the processing unit associated with the receiver may identify the paths as the optimal set of paths based on the estimate of the channel and the number of paths determined above.

The process then calculates an RF precoding matrix (step 1130). For example, in step 1130, the processing unit associated with the receiver may calculate the RF precoding matrix for a transmitter to use in transmitting signals to the receiver. Thereafter, the process calculates a BB precoding matrix (step 1135). For example, in step 1135, the processing unit associated with the receiver may calculate the BB precoding matrix for a transmitter to use in transmitting signals to the receiver.

The process then calculates an RF combiner matrix (step 1140). For example, in step 1140, the processing unit associated with the receiver may calculate the RF precoding matrix for the receiver to use in receiving signals from the transmitter. Thereafter, the process calculates a BB combiner matrix (step 1145). For example, in step 1145, the processing unit associated with the receiver may calculate the BB precoding matrix for the receiver to use in receiving signals from the transmitter. In some embodiments, steps 1140 and 1145 may be performed before steps 1130 and 1135. For example, the processing unit associated with the receiver may calculate the combiner matrices before calculating the precoding matrices.

The process then transmits a feedback message (step 1150). For example, in step 1150, the feedback message may include the calculated precoding matrices, a codebook identifier of the precoding matrices, and/or information according to the feedback frame structure 500 described in FIG. 5 above. In these examples, the receiver and the transmitter used in the uplink or downlink communication are located remotely from one another. For example, in step 1150, a transmitter or feedback chain associated with the receiver (e.g., in the same base station, relay station or user equipment as the receiver) may transmit the feedback message to a remotely-located receiver or feedback chain associated with the remotely-located transmitter (e.g., in the same base station, relay station or user equipment as the transmitter). In one example, the feedback message may be transmitted on the RACH.

Thereafter, the process receives transmitted signals (step 1155). For example, in step 1155, the receiver may receive the transmitted signals from the transmitter, and the signals may be precoded at the transmitter according to the calculated precoding matrices. The process then processes received signals at RF using RF the combiner matrix (step 1160). Thereafter, the process processes received signals at BB using the BB combiner matrix (step 1165), with the process terminating thereafter.

Figure 12:
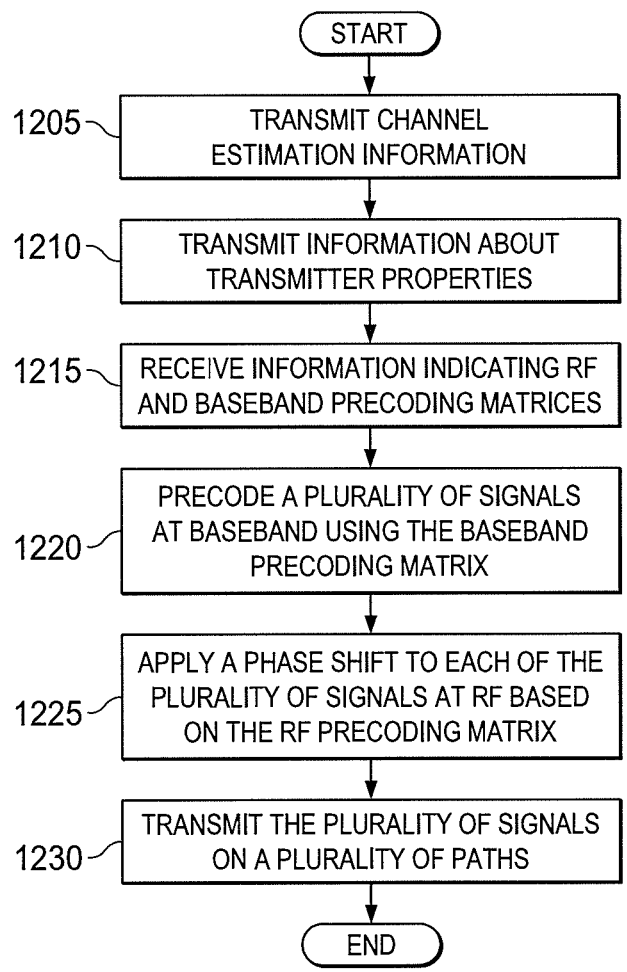
FIG. 12 illustrates a process for transmitting signals using combined baseband and RF precoding in accordance with various embodiments of the present disclosure.

FIG. 12 illustrates a process for transmitting signals using combined baseband and RF precoding in accordance with various embodiments of the present disclosure. For example, the process depicted in FIG. 12 may be performed by the transmitter 402 and the controller 412 in FIG. 4. The process may be used in transmitting uplink or downlink communication. For example, the transmitter may be located in a base station, relay station or user equipment and may transmit signals to a remotely-located receiver.

The process begins by transmitting channel estimation information (step 1205). For example, in step 1205, the channel estimation information may be a reference signal or CSI-RS transmitted to a receiver for the receiver to estimate the channel. The process then transmits information about properties of the transmitter (step 1210). For example, in step 1210, the transmitter may transmit information, such as, for example, without limitation, a number of antennas in the transmitter, a spacing of the antennas, and a number of RF signal processing chains in the transmitter, from the transmitter. This information may be transmitted in the BCH.

Thereafter, the process receives information indicating RF and BB precoding matrices (step 1215). For example, in step 1215, a receiver or feedback chain associated with the transmitter (e.g. in the same base station, relay station or user equipment as the transmitter) may receive a feedback message from a remotely located transmitter or feedback chain associated with the remotely-located receiver. The feedback message may include the calculated precoding matrices, a codebook identifier of the precoding matrices, and/or information according to the feedback frame structure 500 described in FIG. 5 above. In one example, the feedback message may be received on the RACH.

The process then precodes a plurality of signals at BB using the BB precoding matrix (step 1220). Thereafter, the process applies a phase shift to each of the plurality of signals at RF based on the RF precoding matrix (step 1225). The process then transmits the plurality of signals on a plurality of paths (step 1230), with the process terminating thereafter.

Embodiments of the present disclosure provide a precoding algorithm that approaches the theoretical limit on achievable data rates in wireless communication systems. The algorithm does so while satisfying all hardware constraints imposed by practical system hardware. Since these hardware constraints affect precoder design, they have been directly incorporated in the present disclosure, and no other existing precoding solutions exist for the same type of hardware constraints. The algorithm is shown to provide significant improvements in spectral efficiency when compared to traditional techniques, such as beam steering in very realistic scenarios. Therefore, the algorithms in accordance with the present disclosure may provide such significant improvements when deployed in actual systems.

In addition to providing good spectral efficiency, the present disclosure provides a reduction in feedback when compared to traditional MIMO beamforming. This has significant implications on feedback codebook design and frame structure. For example, consider a system with a 256 element square planar array (i.e. 16×16) at the transmitter that is to transmit 2 spatial streams to the receiver. In traditional MIMO systems, the precoder would be assumed to be uniformly distributed over the manifold of unitary matrices. The codebook used, such as the optimal Grassmann codebook, quantizes the optimal precoder, which is calculated at the receiver (which is assumed to have channel knowledge) and feeds the precoder back to the transmitter. In such limited feedback codebooks, the 2 stream precoder for a 256 element transmitter has 1022 free variables that are jointly quantized. This makes such feedback impossible in large wireless communication systems (e.g., mmWave systems), and indeed vector quantization schemes are not commonly used or proposed for systems with more than about 8 antennas.

Embodiments of the present disclosure are unique in the inherent parameterization introduced into the large precoders, which decreases feedback overhead and replaces large vector quantizers with scalar quantizers and vector quantizers of much smaller size. Such feedback decomposition and reduction is unique to the embodiments of the present disclosure and directly affect feedback amount and structure, and thus affect the air interface by the fraction of overhead allotted for feedback as well as the frame structure that results from decomposing feedback into scalar and small vector quantizers.

Further, embodiments of the present disclosure may be implemented based on the concept of orthogonal matching pursuit. However, in other embodiments, any other constrained least squares algorithm, such as, for example, general basis pursuit or least absolute shrinkage and selection operator (LASSO) may be used to implement the concepts of the present disclosure. No matter the algorithm used, the unifying idea of the present disclosure is to provide a precoding system that relies on steering multiple beams using RF processing and combines these beams at baseband in a way that aims at maximizing data rate.

In addition to adopting algorithms other than orthogonal matching pursuit, the system can revise the design of the final baseband precoder. For example, instead of using the baseband precoder that the precoder approximation algorithm (OMP, LASSO, etc.) outputs, the system can recalculate another baseband precoder based on the SVD decomposition of the resulting baseband channel, $W_{RF}^* H F_{RF}^*$, for example. Other baseband solutions can be considered. In other examples, it is also possible to seed the algorithm with any similar matrix (i.e., similar to the matrix $A_t$ which contains the paths in the channel), for example, such as a matrix of array responses for equally spaced look directions, which would arrive at a similar solution. Moreover, embodiments of the present disclosure may be implemented where one terminal has enough RF chains to perform maximum ratio transmission or combining.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for enabling combined baseband (BB) and radio frequency (RF) processing of signals, the method comprising:
receiving, by a receiver, channel estimation information for a channel between a transmitter and the receiver;
identifying a number of transmitter RF signal processing chains in the transmitter, a number of receiver RF signal processing chains in the receiver, and which of the transmitter and the receiver has a lower number of RF signal processing chains;
identifying a plurality of paths in the channel based on the channel estimation information, the plurality of paths including a path in the channel for each of the lower number of RF signal processing chains;
calculating an RF precoding matrix for precoding one or more signals to be transmitted on each of the identified paths, the RF precoding matrix comprising a phase shift for each of the identified paths; and
calculating a BB precoding matrix for precoding the one or more signals by a BB precoding unit associated with the transmitter.

2. The method of claim 1 further comprising:
calculating an RF combiner matrix for processing one or more received signals by a plurality of RF signal processing chains, the RF combiner matrix comprising a phase shift for each of the identified paths; and
calculating a BB combiner matrix for processing the one or more received signals by a BB combiner unit associated with the receiver.

3. The method of claim 1, the method further comprising:
transmitting a feedback message comprising information about the calculated RF and BB precoding matrices to a remote receiver associated with the transmitter.

4. The method of claim 3, wherein the feedback message further comprises information about one or more beam steering directions for each of a plurality of RF signal processing chains in the transmitter.

5. The method of claim 1 further comprising:
receiving information about the number of RF signal processing chains in the transmitter from the transmitter and at least one of a number of antennas in the transmitter or a spacing of the antennas in the transmitter; and
using the information received in calculating the RF and BB precoding matrices.

6. The method of claim 1, wherein a processing unit associated with the receiver is configured to calculate the RF and BB precoding matrices and wherein one of:
the receiver is used in downlink communication and is located in a user equipment, and
the receiver is used in uplink communication and is located in a base station or relay station.

7. A method for transmitting signals using combined baseband (BB) and radio frequency (RF) precoding, the method comprising:
transmitting, to a receiver, information about a number of transmitter RF signal processing chains in a transmitter;
receiving information indicating RF and BB precoding matrices determined based on the number of transmitter RF signal processing chains and a number of receiver RF signal processing chains in the receiver;
precoding, by a BB precoding unit, a plurality signals to be transmitted;
applying, by each of a plurality of RF signal processing chains, a phase shift to at least one of the plurality of signals; and
transmitting the plurality of signals on a plurality of paths corresponding to the applied phase shifts, the plurality of paths including a path in the channel for each of a lower number of RF signal processing chains identified between the number of transmitter RF signal processing chains in the transmitter and the number of receiver RF signal processing chains in the receiver.

8. The method of claim 7, wherein the BB precoding unit is configured to precode the plurality signals using the BB precoding matrix, and wherein the RF precoding matrix comprises the phase shift for each of the plurality of paths.

9. The method of claim 8, wherein precoding performed by the plurality of RF signal processing chains is constrained to the phase shift for each of the plurality of paths included in the RF precoding matrix.

10. An apparatus comprising:
a receiver configured to receiving channel estimation information for a channel between a transmitter and the receiver; and
a processing unit configured to:
identify a number of transmitter RF signal processing chains in the transmitter, a number of receiver RF signal processing chains in the receiver, and which of the transmitter and the receiver has a lower number of RF signal processing chains;

identify a plurality of paths in the channel based on the channel estimation information, the plurality of paths including a path in the channel for each of the lower number of RF signal processing chains;

calculate a radio frequency (RF) precoding matrix for precoding one or more signals to be transmitted on each of the identified paths, the RF precoding matrix comprising a phase shift for each of the identified paths; and calculate a baseband (BB) precoding matrix for precoding the one or more signals by a BB precoding unit associated with the transmitter.

11. The apparatus of claim 10, wherein the receiver comprises:

a BB combiner unit; and the number of receiver RF signal processing chains, wherein the processing unit is further configured to:

calculate an RF combiner matrix for processing one or more received signals by the receiver RF signal processing chains, the RF combiner matrix comprising a phase shift for each of the identified paths; and calculate a BB combiner matrix for processing the one or more received signals by the BB combiner unit.

12. The apparatus of claim 10, wherein the transmitter is a remote transmitter, the apparatus further comprising:

a transmitter associated with the receiver and configured to transmit a feedback message comprising information about the calculated RF and BB precoding matrices to a remote receiver associated with the remote transmitter.

13. The apparatus of claim 12, wherein the feedback message further comprises information about one or more beam steering directions for each of a plurality of RF signal processing chains in the remote transmitter.

14. The apparatus of claim 10, wherein:

the receiver is configured to receive information about the number of RF signal processing chains in the transmitter from the transmitter and at least one of a number of antennas in the transmitter or a spacing of the antennas in the transmitter; and the processing unit is configured to use the information received to calculate the RF and BB precoding matrices.

15. The apparatus of claim 10, wherein one of:

the apparatus is used in downlink communication and is located in a user equipment; and the apparatus is used in uplink communication and is located in a base station or relay station.

16. An apparatus comprising:

a transmitter configured to transmit, to a remote receiver, information about a number of transmitter RF signal processing chains in the transmitter; and a receiver configured to receive information indicating RF and BB precoding matrices determined based on the number of transmitter RF signal processing chains and a number of receiver RF signal processing chains in the remote receiver, wherein the transmitter comprises:

a baseband (BB) precoding unit configured to precode a plurality signals to be transmitted;

the transmitter RF signal processing chains each configured to apply a phase shift to at least one of the plurality of signals; and a plurality of antennas configured to transmit the plurality of signals on a plurality of paths corresponding to the applied phase shifts, the plurality of paths including a path in the channel for each of a lower number of RF signal processing chains identified between the number of transmitter RF signal processing chains in the transmitter and the number of receiver RF signal processing chains in the remote receiver.

17. The apparatus of claim 16, wherein the BB precoding unit is configured to precode the plurality signals using the BB precoding matrix, and wherein the RF precoding matrix comprises the phase shift for each of the plurality of paths.

18. The apparatus of claim 17, wherein precoding performed by the plurality of RF signal processing chains is constrained to the phase shift for each of the plurality of paths included in the RF precoding matrix.

19. The apparatus of claim 16, wherein:

the apparatus is configured to perform downlink communication and is located in a base station or relay station; or the apparatus is configured to perform uplink communication and is located in a user equipment.

20. The method of claim 7, wherein:

the transmitter transmits the plurality of signals in downlink communication and is located in a base station or relay station; or the transmitter transmits the plurality of signals in uplink communication and is located in a user equipment.

* * * * *